(12) United States Patent
Noehring et al.

(10) Patent No.: US 8,850,225 B2
(45) Date of Patent: Sep. 30, 2014

(54) METHOD AND SYSTEM FOR CRYPTOGRAPHIC PROCESSING CORE

(75) Inventors: Lee Noehring, Glendale, AZ (US); Kevin Osugi, Gilbert, AZ (US); Darren Parker, Arlington, VA (US); Nhu-Ha Yup, Pheonix, AZ (US)

(73) Assignee: Exelis Inc., McLean, VA (US)

(*) Notice: Subject to any disclaimer, the term of this patent is extended or adjusted under 35 U.S.C. 154(b) by 44 days.

(21) Appl. No.: 12/762,246

(22) Filed: Apr. 16, 2010

(65) Prior Publication Data

US 2011/0258457 A1 Oct. 20, 2011

(51) Int. Cl.
*G06F 21/00* (2013.01)
*H04L 29/06* (2006.01)

(52) U.S. Cl.
CPC ............ *H04L 63/0428* (2013.01); *H04L 69/18* (2013.01)
USPC ........................................................ 713/189

(58) Field of Classification Search
CPC ......... H04L 9/0618; H04L 9/065; H04L 9/18; H04L 63/08
USPC ........... 713/189, 192; 380/37, 42; 712/32, 36, 712/37
See application file for complete search history.

(56) References Cited

U.S. PATENT DOCUMENTS

| | | | |
|---|---|---|---|
| 7,136,995 B1 | 11/2006 | Wann | |
| 7,184,274 B2 | 2/2007 | Wu et al. | |
| 7,962,741 B1 * | 6/2011 | Alexander et al. | 713/151 |
| 2002/0191793 A1 * | 12/2002 | Anand et al. | 380/255 |
| 2006/0021022 A1 * | 1/2006 | Krishna et al. | 726/13 |
| 2008/0261450 A1 | 10/2008 | Nguyen et al. | |
| 2009/0113218 A1 | 4/2009 | Dolgunov et al. | |
| 2009/0182931 A1 | 7/2009 | Gill et al. | |

OTHER PUBLICATIONS

International Search Report and Written Opinion in PCT Appln. No. PCT/US2011/000689, mailed on Aug. 12, 2011.
International Preliminary Report on Patentability mailed Oct. 16, 2012 in PCT/US2011/000689.
International Search Report and Written Opinion mailed Jun. 21, 2012 in PCT/US2012/032749.

* cited by examiner

*Primary Examiner* — Edward Zee
(74) *Attorney, Agent, or Firm* — Davidson Berquist Jackson & Gowdey LLP

(57) ABSTRACT

A combination firmware and hardware cryptographic core architecture is provided for encrypting, decrypting and authenticating data. The core provides flexibility to change and add new cryptographic protocols, while providing increased performance by loading new firmware into a microcontroller that programs behavior of various components in the core. The core combines a microcontroller programmable by firmware, and flexible aligner, insertion and removal controllers programmed by the microcontroller that process, manage and manipulate an incoming data stream as it moves through the core. The firmware may be reprogrammed upon an enhancement or change to a protocol while still realizing performance benefits of the hardware. Reprogramming the microcontroller allows it to change the way the aligner, insertion and removal controllers manipulate the data stream as it enters various components. Such systems provide redesign time savings compared to hardware cryptographic core architectures, and improved speed and throughput compared to software cryptographic core architectures.

6 Claims, 5 Drawing Sheets

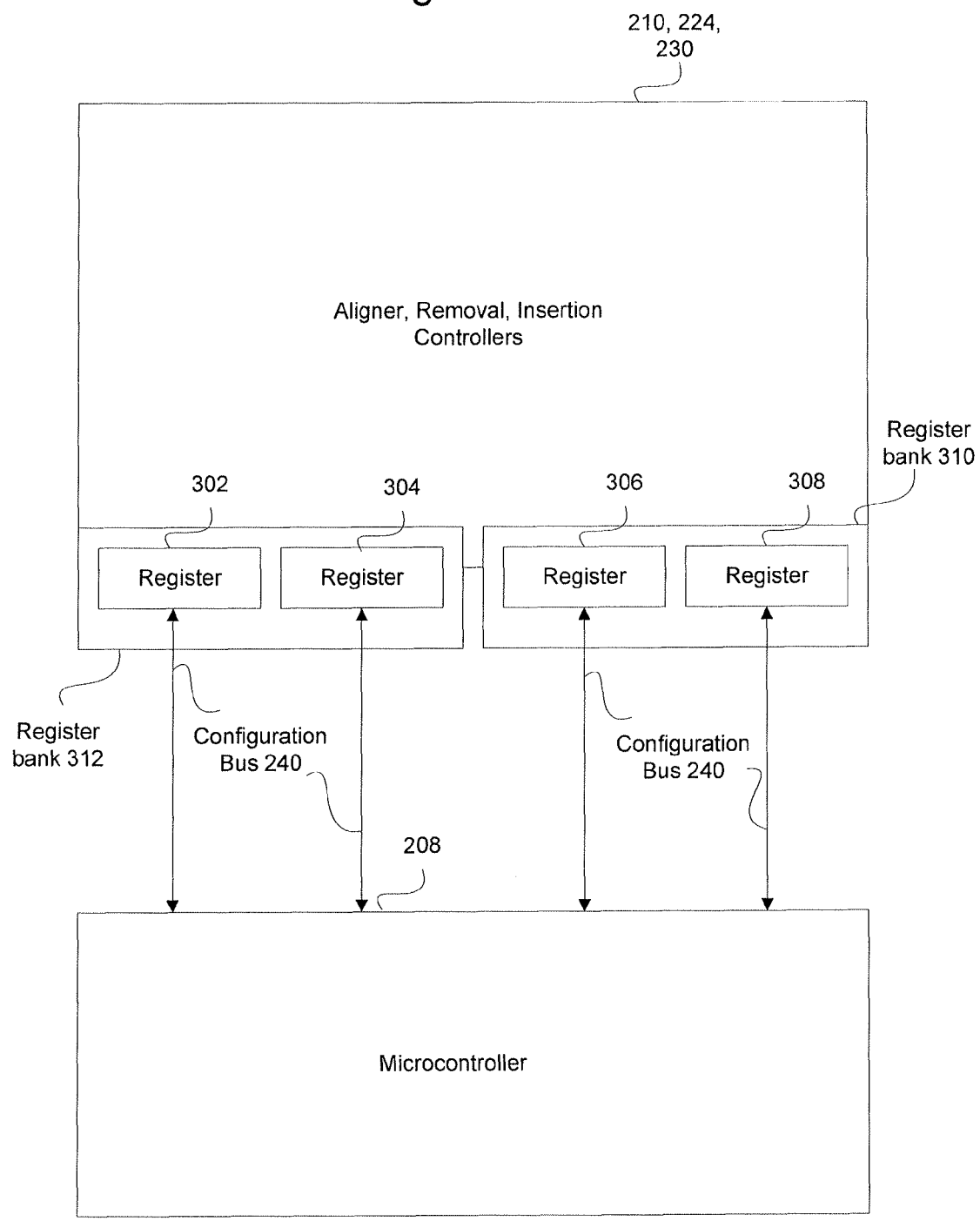

METHOD AND SYSTEM FOR CRYPTOGRAPHIC PROCESSING CORE

This generally relates to cryptography and more particularly to cryptographic processing cores.

BACKGROUND

The rapid growth in Internet usage has increased the dependency on information stored and communicated by businesses and individuals. In particular, growth in DSL and cable modem usage by consumers and businesses and increased business-to-business Internet activity have contributed to this dependency. As the desire for confidentiality, authenticity, and integrity increases, an increasing proportion of this information is sent in secure or encrypted form. Also, an increasing proportion of electronic communication will occur at increasingly fast speeds.

Secure communications are desirable for sensitive activities like on-line financial transactions or the transmission of personal medical information, but can require significantly increased processing demands at both ends of a communications session. This processing demand is further increased as communication bandwidth improves and increases the volume of data for security processing. As the demand for secure Internet communication increases, security processing needs consume ever increasing proportions of the available central processing capability of communications network servers.

In secure Internet communication, for example, Internet Protocol (IP) communication servers encrypt, decrypt, sign and authenticate inbound and outbound data packets to accomplish typical IP communication. Cryptographic processors and other devices accomplish or share some of the cryptographic processing load such as the encrypting, decrypting and authenticating of data packets.

Modern cryptographic devices typically contain a processor that exercises a cryptographic algorithm in combination with a private or public key(s). The processor (and, more particularly, the processor core) can be formed in hardware, such as in an application-specific integrated circuit (ASIC) so the cryptographic algorithm and/or key(s) can be hard-coded at the time of manufacture, or in software, such as in a field-programmable device so the cryptographic algorithm and key(s) can be upgraded and reprogrammed easily.

In the hardware cryptographic core architecture, hardware Direct Memory Access (DMA) engines move data to and from encryption and authentication engines. The encryption engines apply the cryptographic algorithm to the data, and the authentication engines authenticate some or all of the datagram containing the encrypted data. Further, the encryption and authentication engines are also implemented in hardware. In the hardware scenario, the architecture includes hardware protocols (e.g., Internet Protocol Security (IPSec), Secure Real-time Transport Protocol (SRTP), High Assurance Internet Protocol Encryptor (HAIPE®), BULK) and parses the data stream and calculates encryption and authentication start and end points to program the encryption and authentication engines. In the hardware architecture, in the IPSec protocol for example, preprocessing and security features such as the Initial Vector (IV), Message Authentication Code (MAC), padding and others, are inserted in the outbound packet and removed from the inbound packet. When these and other encryption protocol requirements are changed or enhanced, the hardware design becomes out-of-date, must be re-designed taking into account the changes and enhancements, and must be reintroduced as a newly-programmed hardware chip. This process is an expensive and time-consuming way to upgrade a cryptographic algorithm.

Alternatively, the software cryptographic core architecture includes encryption and authentication engines comprising software. In that alternative, the software parses and processes the protocols and calculates the encryption and authentication start and end points in the data stream. Software core architectures typically suffer from the problem of being slow to do insertions and removals of various bytes (again using the IPSEC protocol as an example), such as the IV, MAC, padding and other preprocessing and security features that are inserted into the outbound packet and removed from the inbound packet.

Thus, the hardware cryptographic core architecture is a faster option for processing, but is not flexible enough to update protocols or add new protocols. In this scenario, modifications to the design and fabrication of a new chip for each new protocol update are expensive. The software cryptographic core architecture is flexible, but its processing performance is low and is not always suitable for high-speed security systems. Furthermore, conventional systems typically manage security protocol information external to the cryptographic core.

Accordingly, there is a desire for an architecture that gives the flexibility to add new protocols or update current protocols by eliminating new chip re-fabrication requirements and a reduction in time-to-market, while also providing improved speed and throughput compared to software cryptographic core architectures.

SUMMARY

In accordance with methods and systems consistent with the present invention, a cryptographic processor is provided that comprises an input that receives an input data stream, and a configurable controller to align the received input data stream, insert data into the input data stream, or remove data from the input data stream. It also comprises a programmable microcontroller that programs the configurable controller to process the input data stream, and a cipher engine to encrypt the input data stream.

In accordance with methods and systems consistent with the present invention, a method is provided in a data processing system having a cryptographic processor. The method receives an input data stream indicating a cryptographic protocol, and receives an indication of the cryptographic protocol by a microcontroller in the cryptographic processor. It further programs, based on the indicated cryptographic protocol, a configurable controller in the cryptographic processor that performs one of aligning the received input data stream, inserting data into the input data stream, or removing data from the input data stream. Additionally, the method encrypts or decrypts on the received input data stream.

BRIEF DESCRIPTION OF THE DRAWINGS

FIG. 3 depicts exemplary alignment, removal and insertion controllers and configurable registers for programming the controllers in accordance with methods and systems consistent with the present invention.

DETAILED DESCRIPTION

Figure 1:
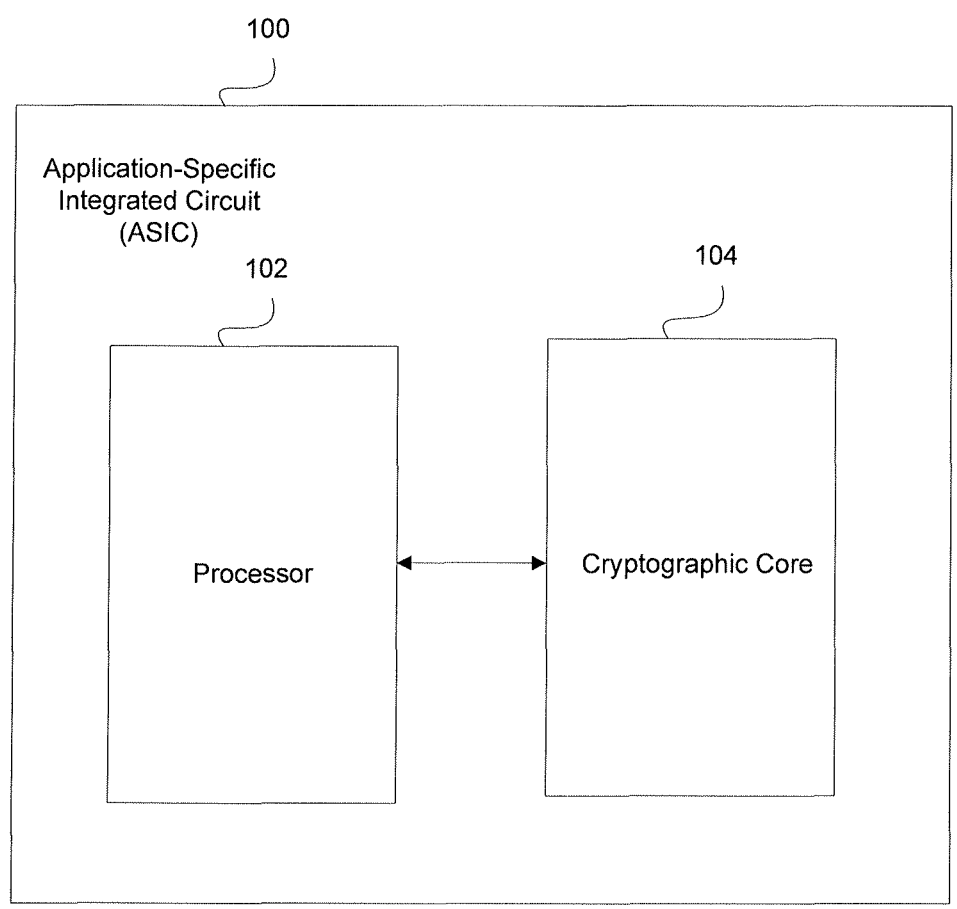
FIG. 1 illustrates an exemplary application-specific integrated circuit (ASIC) including an exemplary cryptographic core in accordance methods and systems consistent with the present invention.

Methods and systems in accordance with the present invention provide flexibility to add new cryptographic protocols, while providing increased performance when compared to software cryptographic core architectures. They do so by loading new firmware or software into a microcontroller that interacts with various components of the architecture to program behavior of the components. Such systems provide a savings compared to the hardware cryptographic core architecture design due to the elimination of new chip re-fabrication requirements and a reduction in time-to-market. The systems also provide improved speed and throughput when compared to the software cryptographic core architecture. The firmware may be reprogrammed upon an enhancement or change to a protocol while still realizing the performance benefits.

Methods and systems in accordance with the present invention remain flexible and dynamic, with the ability to support different current protocols as well as future protocols while providing high speed and performance. The cryptographic core manages encryption protocols internally while remaining easily changeable, thereby providing a new level of programmability. The flexibility improves upon cryptographic core engines that may maintain encryption protocol information internally but are not changeable. The programmability allows additional flexibility in the insertion, removal and alignment of data, and the management of initial vectors, for example.

To this end, methods and systems in accordance with the present invention may combine a microcontroller programmable by firmware, and flexible aligner, insertion and removal controllers that process and manage an incoming data stream. The microcontroller programs and manages the aligner, insertion and removal controllers in the cryptographic core, and these components process the data stream internally as the data moves to the encryption engine, the authentication engine, and the output buffer. Reprogramming the microcontroller allows it to control the aligner, insertion and removal controllers to change the way they manipulate the data stream as it enters various components of the core. Conventional microcontrollers outside of a cryptographic core, or even outside of the chip, do not affect the internal programming throughout the cryptographic core.

In one implementation, the cryptographic core resides in an application-specific integrated circuit (ASIC) and encrypts, decrypts and/or authenticates a received data stream. The cryptographic core includes various controlled hardware components, such as input and output buffers, an encryption and decryption (cipher) engine, and an authentication engine. (Encrypt and decrypt may also be referred to as cipher, and an encryption and decryption engine may be referred to herein as a cipher engine.) It also includes aligner, removal and insertion controllers that include configurable registers that can be programmed by the microcontroller and its firmware. As described below, in one implementation, the aligner, removal and insertion controllers have at least two register banks that the microcontroller can program to pipeline the packets, thereby increasing throughput and speed.

FIG. 1 illustrates an exemplary ASIC housing an exemplary cryptographic core in accordance methods and systems consistent with the present invention. The cryptographic core 104 may be in an ASIC 100 that performs, for example, network processing. Alternatively, it may be a field-programmable gate array (FPGA), or may be implemented in any other suitable manner. The data stream input to the cryptographic core 104 may come from, for example, a network processor 102 that receives data from the Internet, and the cryptographic core returns its output data stream to the processor or other component(s).

Figure 2:
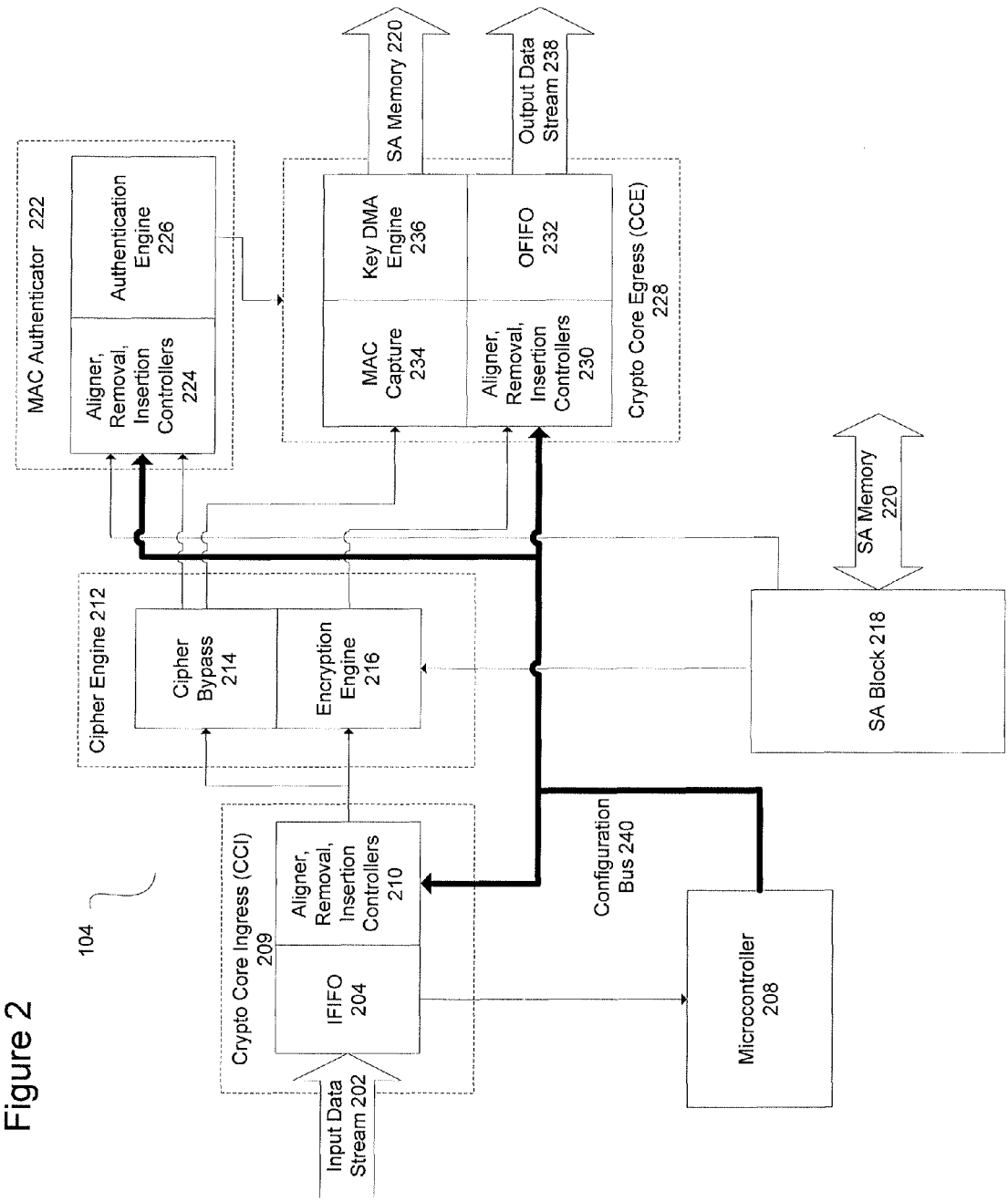
FIG. 2 depicts an exemplary cryptographic core in accordance with methods and systems consistent with the present invention.

FIG. 2 depicts an exemplary cryptographic core in accordance with methods and systems consistent with the present invention. In one implementation, the components in the cryptographic core 104 are hardware components, although the microcontroller 208 includes firmware. However, other implementations are possible in which one or more components are software components. The cryptographic core 104 receives an input data stream 202 and produces an encrypted output data stream 238, or receives an encrypted data stream and produces a decrypted data stream. The input data stream 202 may be received by an input First-in First-out buffer (IFIFO) 204 from a processor 102 external to the cryptographic core 104. For example, the processor 102 may want to encrypt a packet in the ESP protocol, and will send it to the cryptographic core 104 to do so. Additionally, the external processor 102 may perform some preprocessing and sanity checks on the packet before its arrival at the cryptographic core 104.

The input data stream 202 may be a packet or a group of packets. The packet may include data and a header which provides information to the cryptographic core 104 about how to process the packet. The external preparation of the packet will be based on how the microcontroller 208 is programmed. The packet header can be explicit, instructing the microcontroller 208 in a detailed manner, or it may be simple, such as simply indicating a protocol, wherein the microcontroller has the instructions for processing the packet already. In one implementation, the packet is an IP packet and may have a MAC header, and an IP header, as well as data to be encrypted, decrypted or authenticated. In one embodiment, the packet ranges between 40 bytes and 8 k bytes.

The input data stream 202 is received at a Cryptographic Core Ingress (CCI) 209 and is subsequently encrypted (or decrypted) at the cipher engine 212. The cipher engine 212 which performs the encryption or decryption uses an algorithm programmed by the Security Association (SA) block 218 and received from the SA memory 220. The SA block 218 includes three separate buffers and nine registers as well as a Crypto Control Register (not shown) that includes CAC (Crypto Arc Core) control word, programmed by firmware, which provides the cipher algorithm to be performed and steers the data and the key to the cipher engine 212. Message authentication is computed in the MAC Authenticator 222, and the encrypted or decrypted data is output at the Cryptographic Core Egress (CCE) 228. Each of these elements is discussed further below.

The CCI 209 includes an IFIFO 204 to store the received packet, including its header and data received in the input data stream 202 to be processed. The CCI 209 may also include a DMA engine (not shown) to move data to and from the IFIFO 204, or alternatively DMA functions may operate outside of the CCI. In one implementation, the IFIFO 204 is a 512 byte buffer. The packet's header may indicate, inter alia, a protocol to be used by the cryptographic core 104 to process, encrypt, decrypt and authenticate the data. The packet's header may be, for example, 32 bytes or 64 bytes long. The IFIFO 204 buffers the header and data, and uses a write pointer as a destination pointer for the DMA, and uses a read pointer as a source pointer for once the data is in the IFIFO.

After the header, e.g., the first 32 or 64 bytes of the packet, moves into the IFIFO 204, the microcontroller 208 is notified via an interrupt, and it starts reading the header and programming the aligner, removal and insertion controllers (ARI) 210, 224, 230. The microcontroller 208 determines the protocol and how the ARI controllers 210, 224, 230 need to be programmed based on the header information read from the IFIFO 204. Once the ARI controllers 210 are programmed, the microcontroller 208 then enables the ARI controllers to read the data from the IFIFO 204, for example, by moving the read pointer to the appropriate point in the data. Subsequently, the ARI controllers 210 then read the data.

The ARI controllers 210 insert, remove and align data in the packet so that it can properly be encrypted and authenticated according to the indicated cipher and hash algorithm. ARI controllers 210, 224, 230 may be broken in different blocks of different controllers that allow different types of data manipulation in certain areas.

Insertion adds bytes of data to the packet in appropriate areas. Typically, software external to a cryptographic core inserts data, but methods and systems in accordance with the present invention may avoid the need for external software to do insertions to a packet. For example, in IPSec ESP, padding is inserted at the end of the packet to align it to a certain block size. The insertion controllers can be programmed to insert a certain number of bytes, zeros or incrementing bytes at a particular offset in the packet, or manually insert bytes at any data offset. In one implementation, the insertion controllers can insert up to 256 bytes of specific data. Furthermore, in an IPSEC header or an ESP trailer, it can also insert a pad byte length and the next header value. Since it is known before even the start of the processing of a packet that the data will need to be inserted at the end, it can be set up to be inserted before the end arrives. Inserted data can be encrypted, decrypted or authenticated or can pass through untouched.

Additionally, the insertion controllers could insert an IV into the packet at any offset such as after the ESP header of an ESP outbound packet. In an alternative embodiment, the insertion controllers could also provide a key in this way, although a key would typically be provided by the SA block 218 described below. For example, in AES which has a key for encryption and a reverse key for decryption, the encryption key can be provided and the reverse key can then be calculated and provided back to the user.

For ease of design and production, the ARI controllers 210, 224, 230 may all be the same, but are typically programmed for different purposes. Insertion typically occurs in the CCI ARI controllers 210, while removal typically occurs in the CCE ARI controllers 224 before the packet leaves the cryptographic core 104. However, the ARI controllers 210, 224, 230 have the capability to perform alignment, insertion and removal. They have the capability to remove bytes at any data offset. For example, for inbound ESP packets, the ESP header is authenticated, but after authentication and before its exit through the output First-in First-out buffers (OFIFO) 232, the ESP header is removed because it is no longer needed. In this case, the removal controllers have been programmed by the microcontroller 208 to remove a particular amount of data at a particular offset.

The ARI controllers 210, 224, 230 also align data for encryption, authentication and output data. For example, if the cipher and/or authentication data does not align on a 64-bit boundary, the ARI controllers 210, 224, 230 will align it on a 64-bit boundary. This way, the incoming packet does not need to be aligned before entering the IFIFO 204. Any other type of alignment may be performed.

FIG. 3 depicts exemplary ARI controllers 210, 224, 230 and configurable registers 302-308 used to program the controllers in accordance with methods and systems consistent with the present invention. The microcontroller 208 programs the ARI controllers 210, 224, 230 through the configurable registers 302-308 based on instructions from its firmware as well as information received in the incoming packet's header. As shown on the Figure, the ARI controllers 210, 224, 230 include several registers 302-308 with which the microcontroller 208 interacts via bus 240, arranged in two banks of registers 310-312. Although a limited number of registers 302-308 are shown, any number of registers may be used. When the microcontroller 208 accesses the registers 302-308, some registers may also provide information back to the microcontroller. To pipeline the process, for one packet, the ARI controllers 210, 224, 230 receive and act on information from the first bank of registers 310, while the microcontroller 208 programs the second bank of registers 312. When the ARI controllers 210, 224, 230 complete receiving information from the first bank of registers 310, they then proceed to receive information from the second bank of registers 312, while the microcontroller 208 works on the next packet and programs the first bank of registers 310. In this manner, throughput for packets is improved and latency due to the programming of the registers 302-308 is avoided. The architecture provides high performance throughput through the cryptographic core 104.

The microcontroller 208 is a processor that executes code, and in one implementation, it is a 32-bit RISC processor. In one implementation, the microcontroller 208 reads the header, e.g., the first 32-64 bytes of the packet, but does not read the rest of the data. The microcontroller 208 is programmed to be able to read data that is sent in, and can be programmed to be intelligent or relatively basic depending on the data sent in. In addition to programming the ARI controllers 210, 224, 230 to determine the data flow according to the encryption algorithm, the microcontroller 208 also determines the start and end of the encryption and authentication of the data stream.

The SA (Security Association) block 218 provides the cipher algorithm and SA information to the cipher engine 212. DMA engines (not shown) access the SA information including cryptographic keys, initial vectors, and any alternative or other security associations from the SA memory 220. The SA memory 220 stores keys, and in one implementation, is on the ASIC 100. The SA memory 220 may get keys and other security associations from a DDR interface or an internal key cache. Although IVs mostly enter through the IFIFO, the SA memory 220 may also store IVs, or alternatively, IV's can be created through randomizers (not shown). The SA block 218 stores the security associations fetched from the external SA memory 220 by the DMA engine. The SA block 218 transfers the security associations to the encryption engine 212.

When the data stream packet enters, the SA block 218 reads the first 8 bytes of the packet, which includes the location and size of the SA entry. In the interest of speed, the SA block 218 may start reading in the key information from the SA memory 220 before the rest of the packet is finished entering the cryptographic core 104. In one embodiment, the SA block 218 may hold three different keys for three different packets. For example, if the packets are small enough, the IFIFO 204 may hold three packets at one time, and the SA block 218 can load three corresponding keys to decrease latency and increase throughput. The CAC command word in the SA block 218 denotes which cipher engine and which authentication engine to which the key goes. The SA block 218 determines whether the key goes to the cipher engine 212 or the authentication engine 226 and provides those keys to the appropriate engine.

The cipher engine 212 includes an encryption (and conversely a decryption) engine 216 to encrypt the input data stream 202 as modified by the ARI controllers 210 according to the programmed algorithm using the security associations provided by the SA block 218. This encryption engine 216 may also decrypt the input data stream 202. The cipher engine 212 can include any encryption engine, such as, for example, Advanced Encryption Standard (AES), Data Encryption Standard (DES), Triple Data Encryption Standard (TDES), or any others, and may support different key sizes, e.g., 128 bit, 192 bit and 256 bit, and can dynamically switch between multiple algorithms and key sizes on a per packet basis.

The cipher bypass (CBP) 214 passes the data received from the CCI 209 to the CCE 228 and/or the MAC authenticator 222 without encryption or decryption. When it passes the data to the MAC authenticator 222, the authentication engine 226 authenticates the unprocessed unencrypted data. Alternatively, the cipher engine 212 may also pass the data to the MAC authenticator 222 after encryption or decryption (not shown on figure).

The MAC authenticator 222 includes ARI controllers 224 and an authentication engine 226. As shown on FIG. 3, the ARI controllers 224 may be the same as the ARI controllers 210 and 230, but will be programmed differently to process the packet for the authentication engine 226. For example, there might be an IV that does not need to be authenticated and can be removed before authentication.

The authentication engine 226 is a dead end for data, i.e., data comes in but does not come out. The authentication engine 226 creates a hash value which can be a MAC (a MAC uses a key while a hash value does not), and the hash value or MAC is sent to the CCE 228. This hash value or MAC is used by the CCE 228 to authenticate the data it receives from the cipher engine 212. The hash value may be created and appended to data before being sent out for outbound data, and, for inbound data, may be created and compared to the tag at the end of a packet for authentication. The authentication engine 226 may use, for example, the Secure Hash Algorithm 1 (SHA1), Secure Hash Algorithm 224 (SHA224), Secure Hash Algorithm 256 (SHA256), and Secure Hash Algorithm 384 (SHA384), Secure Hash Algorithm 512 (SHA512) or any others. Once the authentication engine 226 provides the hash or MAC to the CCE 228, if the packet is an inbound packet, the CCE 228 determines if the MAC at the end of the inbound packet corresponds to the MAC received in the data. If the packet is an outbound packet, the CCE 228 adds the created MAC to the end of the packet.

The CCE 228 post-processes the data from the cipher and authentication engines and sends it out in an output data stream 238. In one implementation, the CCE 228 comprises a MAC capture component 234, ARI controllers 230, key DMA engines 236 and an output First-in First-out buffer (OFIFO) 232. The MAC capture component 234 captures the MAC from the input data stream 202 at a location programmed by the microcontroller 208 and its firmware.

As shown on FIG. 3, the ARI controllers 230 are configured by the microcontroller 208 to perform the same or similar functions as ARI controllers 210 and 224. The OFIFO 232 buffers data to be sent to the output data stream 238. Like the IFIFO 204, a DMA engine (not shown) moves data from the OFIFO 232 to the output stream 238. An external DMA engine (not shown) uses a read pointer of the OFIFO 232 as its source and uses its write buffer as its destination to transfer the output data stream 238, continually clearing more room in the OFIFO for the next data to be processed.

If a packet is received that is encrypted and has a MAC associated with it, for example, coming from a security network, the MAC capture 234 will capture, for example, the 12 bytes of the MAC at the end of the packet. To check if the authentication is correct, the MAC capture 234 compares the captured MAC to the MAC value provided by the authentication engine 226. This captured MAC is typically not encrypted and would come through the cipher bypass 214, or alternatively the MAC could also come to the ARI controllers 230. On an outbound packet, the MAC capture 234 does nothing.

The MAC can be saved in the SA memory 220 via the key DMA engine 236 so that it does not need to be recalculated. For example, if a 2 MB file is received, it may only come in 8 k blocks, and the created MAC may be saved as intermediate data in the SA memory 220. The key DMA engine 236 moves the calculated MAC between the SA memory 220 and the authentication engine 226.

Figure 4A:
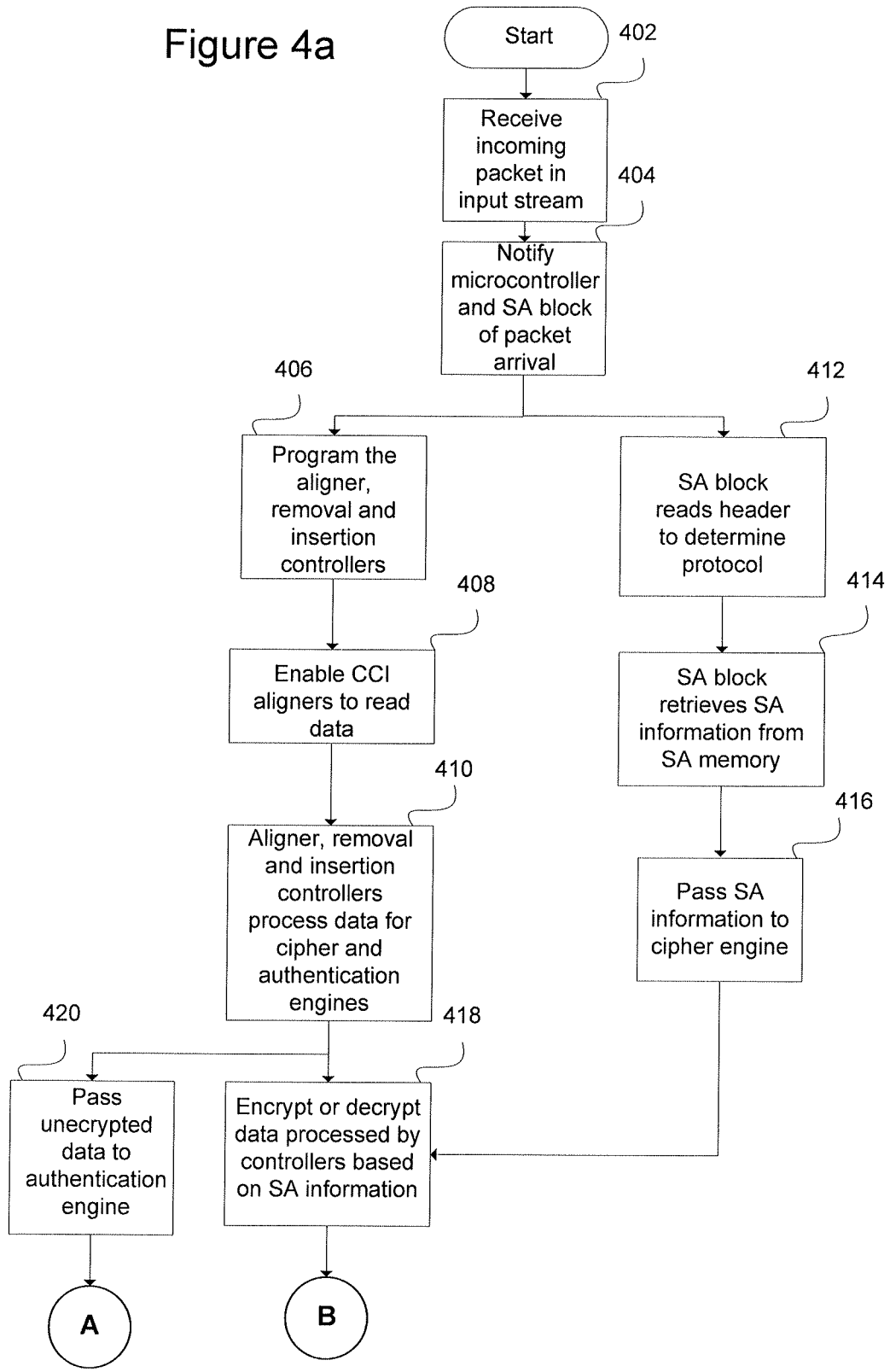
FIGS. 4a and 4b depict exemplary steps in a method for operation of an exemplary cryptographic core in accordance with methods and systems consistent with the present invention.
Figure 4B:
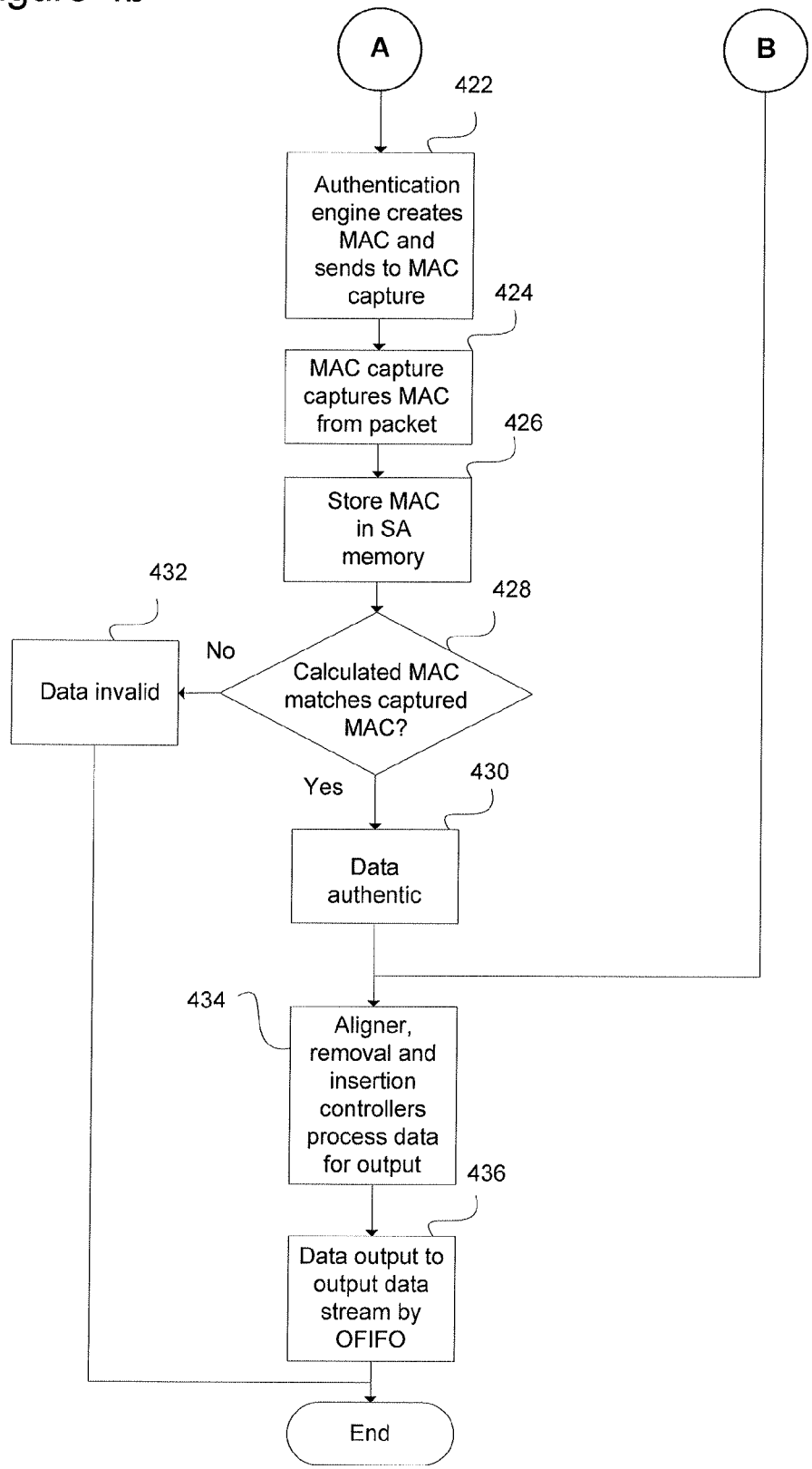

FIGS. 4a and 4b depict exemplary steps in a method for operation of an exemplary cryptographic core 104 in accordance with methods and systems consistent with the present invention. These steps will be described in conjunction with components of FIG. 2. First, an incoming packet in the input data stream 202 is received by the CCI 209 (step 102). A DMA engine controls the receipt of the input data stream into the IFIFO 204, and an interrupt notifies the microcontroller 208 and the SA block 218 that the packet and the header having the protocol information is in the IFIFO (step 404). The microcontroller 208 programs the CCI ARI controllers 210, 224, 230 based on the protocol information received in the packet header (step 406), and moves the read pointer to enable the CCI ARI controllers 210 to read the rest of the data in the packet (step 408). The programmed CCI ARI controllers 210 process the data as described above by making insertions, alignments and removals to prepare it for the cipher engine 212 (step 410).

Meanwhile, the SA block 218 reads the first 8 bytes of the packet to determine the address and size of the SA entry (step 412), and accesses the SA memory 220 for the SA information including, but not limited to, keys, hash values and initial vectors (step 414). The SA block 218 passes the encryption algorithm and security associations to the cipher engine 212 (step 416). The cipher engine 212 encrypts or decrypts the data received from the CCI ARI controllers 210 based on the encryption algorithm and SA information received from the SA block 218 (step 418).

During this process, the cipher bypass 214 passes the data unencrypted (or not decrypted) to the MAC authenticator 222 through the ARI controllers 224 previously programmed by the microcontroller 208 which process the data accordingly (step 420). Alternatively, the cipher engine 212 may also pass the data to the MAC authenticator 222 after encryption or decryption. Continued on FIG. 4b, the authentication engine 226 in the MAC authenticator 222 creates a hash value or MAC to be used to authenticate the data and sends it to the MAC capture 234 (step 422). The MAC capture 234 in the CCE 228 reads the MAC from the packet (step 424). In one implementation, the key DMA engine 236 may optionally store the MAC received from the authentication engine 226 in the SA memory 220 (step 426). If the captured MAC matches the received calculated MAC (step 428), the data is authenticated (step 430). If not, it is a failed authentication and an error status is provided (step 432).

The ARI controllers 230 receive the encrypted (or decrypted) data from the encryption engine 216, and process the data for output by making alignments, removals and insertions as indicated by the microcontroller 208 (step 434). Then, the encrypted (or decrypted) data moves from the ARI controllers 230 to the OFIFO 232 to be sent out in the output data stream 238 (step 436).

The foregoing description of preferred embodiments provides illustration and description, but is not intended to be exhaustive or to limit the invention to the precise form disclosed. Modifications and variations are possible in light of the above teachings or may be acquired from practice in accordance with the present invention. It is to be understood that the invention is intended to cover various modifications and equivalent arrangements included within the spirit and scope of the appended claims.

What is claimed is:

1. A cryptographic processor, comprising:
 an ingress section, comprising:
  an input buffer to receive an input data stream; and
  a first configurable controller to:
   (1) align the input data stream;
   (2) insert data into the input data stream; and
   (3) remove data from the input data stream;
 an cipher engine receiving the processed input data stream from the first configurable controller and encrypting the processed input data stream from the first configurable controller;
 an authentication section, comprising:
  a second configurable controller to:
   (1) align the input data stream;
   (2) insert data into the input data stream; and
   (3) remove data from the input data stream;
  an authentication engine receiving the processed input data stream from the second configurable controller and authenticating the processed input data stream;
 an egress section, comprising:
  a third configurable controller to:
   (1) align the received input data stream;
   (2) insert data into the input data stream; and
   (3) remove data from the input data stream;
  an output buffer to receive the processed input data stream from the third configurable controller; and
 a programmable microcontroller, separate from the first, second and third configurable controllers, that programs the first, second and third configurable controllers.

2. The cryptographic processor of claim 1, wherein the programmable microcontroller programs the first, second and third configurable controllers based on information received in the input data stream.

3. The cryptographic processor of claim 1, wherein the cipher engine is configured to decrypt at least part of the input data stream.

4. The cryptographic processor of claim 1, wherein the programmable microcontroller includes firmware that can be programmed.

5. The cryptographic processor of claim 4, wherein the programmable firmware instructs the programmable microcontroller to program the first configurable controller to process the input data stream.

6. The cryptographic processor of claim 1, further including configurable registers programmed by the programmable microcontroller and accessed by the first, second and third configurable controllers to receive instructions from the programmable microcontroller.

\* \* \* \* \*